United States Patent
Horikawa et al.

(10) Patent No.: US 11,635,204 B2
(45) Date of Patent: Apr. 25, 2023

(54) SURFACE COMBUSTION BURNER, COMPOSITE BURNER, AND IGNITION DEVICE FOR SINTERING MACHINE

(71) Applicant: JFE STEEL CORPORATION, Tokyo (JP)

(72) Inventors: Yukimasa Horikawa, Tokyo (JP); Kazuaki Hara, Tokyo (JP); Koji Iwata, Tokyo (JP); Hiromichi Fujiwara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 182 days.

(21) Appl. No.: 16/489,516

(22) PCT Filed: Mar. 22, 2018

(86) PCT No.: PCT/JP2018/011488
§ 371 (c)(1),
(2) Date: Aug. 28, 2019

(87) PCT Pub. No.: WO2018/180915
PCT Pub. Date: Oct. 4, 2018

(65) Prior Publication Data
US 2020/0011525 A1    Jan. 9, 2020

(30) Foreign Application Priority Data

Mar. 27, 2017   (JP) .............................. JP2017-061577

(51) Int. Cl.
*F23D 14/14*   (2006.01)
*B22F 3/00*    (2021.01)
(Continued)

(52) U.S. Cl.
CPC ............ *F23D 14/145* (2013.01); *B22F 3/003* (2013.01); *F23D 14/22* (2013.01);
(Continued)

(58) Field of Classification Search
CPC ...... B22F 3/003; B22F 2301/35; F23D 14/02; F23D 14/145; F23D 14/149; F23D 14/22;
(Continued)

(56) References Cited

U.S. PATENT DOCUMENTS 3,107,720 A * 10/1963 Van Swinderen ...... F23C 99/00
                                                    431/329
3,199,573 A *  8/1965 Fiynn ...................... F23D 14/16
                                                    239/145
(Continued)

FOREIGN PATENT DOCUMENTS

CN    102226523 A    10/2011
EP    0465679 A1     1/1992
(Continued)

OTHER PUBLICATIONS

Feb. 20, 2019, Office Action issued by the Taiwan Intellectual Property Office in the corresponding Taiwanese Patent Application No. 107110301 with English language Concise Statement of Relevance.
(Continued)

*Primary Examiner* — Steven B Mcallister
*Assistant Examiner* — Benjamin W Johnson
(74) *Attorney, Agent, or Firm* — Kenja IP Law PC

(57) ABSTRACT

Provided is a surface combustion burner which solves the passage blocking in a combustion part caused by dust, and enables stable combustion for a long term. The surface combustion burner comprises: a nozzle configured to discharge fuel gas and air for combustion; and a laminate, provided on a tip of the nozzle, in which a plurality of mesh plates is laminated, wherein the laminate includes a portion having an offset arrangement between at least any adjacent ones of the mesh plates.

9 Claims, 8 Drawing Sheets

(51) Int. Cl.
*F23D 14/22* (2006.01)
*F23D 14/02* (2006.01)
*F23D 14/08* (2006.01)
*F23D 14/58* (2006.01)
*F23D 14/68* (2006.01)
*F27B 21/00* (2006.01)

(52) U.S. Cl.
CPC .......... *B22F 2301/35* (2013.01); *F23D 14/02* (2013.01); *F23D 14/08* (2013.01); *F23D 14/14* (2013.01); *F23D 14/149* (2021.05); *F23D 14/58* (2013.01); *F23D 14/68* (2013.01); *F23D 2203/002* (2013.01); *F23D 2203/005* (2013.01); *F23D 2203/103* (2013.01); *F23D 2203/105* (2013.01); *F23D 2203/106* (2013.01); *F23D 2203/1055* (2013.01); *F23D 2212/005* (2013.01); *F23D 2212/201* (2013.01); *F23D 2900/14641* (2013.01); *F27B 21/00* (2013.01)

(58) Field of Classification Search
CPC ......... F23D 2203/002; F23D 2203/005; F23D 2203/103; F23D 2203/1055; F23D 2203/106; F23D 2212/005; F23D 2212/201; F23D 2900/14641; F23D 14/08; F23D 14/58; F23D 14/68; F23D 2203/105; F23D 14/14; F27B 21/00
USPC .......................................................... 431/329
See application file for complete search history.

(56) References Cited

U.S. PATENT DOCUMENTS

| | | | | |
|---|---|---|---|---|
| 3,852,025 A * | 12/1974 | Placek | .................. | F23D 14/145 |
| | | | | 431/329 |
| 3,857,670 A * | 12/1974 | Karlovetz | ............... | D06F 67/02 |
| | | | | 431/329 |
| 4,354,479 A * | 10/1982 | Haruhara | .................. | F23C 3/00 |
| | | | | 126/92 AC |
| 5,380,192 A | 1/1995 | Hamos | | |
| 7,611,351 B2 * | 11/2009 | Krauklis | ................. | F23D 14/66 |
| | | | | 431/328 |

FOREIGN PATENT DOCUMENTS

| | | |
|---|---|---|
| EP | 0628146 A1 | 12/1994 |
| JP | H07504266 A | 5/1995 |
| JP | 2001235117 A | 8/2001 |
| JP | 2002022120 A | 1/2002 |
| JP | 2006194456 A | 7/2006 |
| JP | 2013194991 A * | 9/2013 |
| JP | 2013194991 A | 9/2013 |
| SE | 514250 C2 | 1/2001 |
| WO | 9318342 A1 | 9/1993 |

OTHER PUBLICATIONS

May 22, 2018, International Search Report issued in the International Patent Application No. PCT/JP2018/011488.
Dec. 10, 2020, Office Action issued by the Korean Intellectual Property Office in the corresponding Korean Patent Application No. 10-2019-7030479 with English language concise statement of relevance.
Oct. 29, 2019, Notification of Reasons for Refusal issued by the Japan Patent Office in the corresponding Japanese Patent Application No. 2019-509675 with English language concise statement of relevance.
Feb. 25, 2020, Official Decision of Refusal issued by the Japan Patent Office in the corresponding Japanese Patent Application No. 2019-509675 with English language concise statement of relevance.
Jul. 29, 2020, Office Action issued by the China National Intellectual Property Administration in the corresponding Chinese Patent Application No. 201880019849.X with English language concise statement of relevance.
Feb. 13, 2020, the Extended European Search Report issued by the European Patent Office in the corresponding European Patent Application No. 18777414.6.
Mar. 2, 2021, Office Action issued by the China National Intellectual Property Administration in the corresponding Chinese Patent Application No. 201880019849.X with English language concise statement of relevance.

* cited by examiner

SURFACE COMBUSTION BURNER, COMPOSITE BURNER, AND IGNITION DEVICE FOR SINTERING MACHINE

TECHNICAL FIELD

The disclosure relates to a surface combustion burner which uses liquefied natural gas, liquefied oil gas, city gas, and by-product gas as fuel. In particular, the disclosure relates to a surface combustion burner which has a prolonged lifetime by preventing the passage blocking in a combustion part of the burner surface.

BACKGROUND

In industries, the heating process is important as a process which starts, for example, a chemical reaction of production objects. The objects are heated by various means, but a burner is often used. In a burner, fuel gas and air for combustion are discharged from a nozzle on the end of the burner. The fuel gas is continuously combusted to thereby form flame.

Burners include various types. One of them is a surface combustion burner. A typical surface combustion burner comprises woven metal fibers which are made by knitting special metal fibers with high heat resistance or porous ceramic (hereinafter, collectively referred to as burner mat). Fuel gas is combusted inside or near a surface of the burner mat (for example, JP 2001-235117 A (PTL 1)).

The surface combustion burner enables uniform heating, and is used in various industrial sectors such as the textile industry, the paper industry, and the steel industry (JP 2002-22120 A (PTL 2), JP 2013-194991 A (PTL 3)).

These industry sectors often use fibrous or powdery materials as an object to be heated. Thus, the operating environment has a lot of dust. For example, as described in PTL 2, the textile industry and the paper industry use a surface combustion burner for drying in an environment with a lot of dirt (dust). In that case, a burner mat which forms a combustion surface has dirt deposited on its back side, causing red-hot failure and combustion failure. Therefore, the burner mat needs to be removed for cleaning. PTL 2 proposes a simple detachment structure of a burner mat.

JP 2013-194991 A (PTL 3) proposes that the steel industry should use a surface combustion burner as a fuel ignition burner of a sintering machine for manufacturing sintering raw materials.

CITATION LIST

Patent Literatures

PTL 1: JP 2001-235117 A
PTL 2: JP 2002-22120 A
PTL 3: JP 2013-194991 A

SUMMARY

Technical Problem

However, even if a structure is adopted which has an easily-removable burner mat as proposed in PTL 2, the burner mat needs to be cleaned or exchanged frequently, costing time and money. Therefore, passage blocking in the surface combustion burner is required to be fundamentally solved.

It could thus be helpful to provide a surface combustion burner which solves passage blocking of its combustion part due to dust, and enables stable combustion for a long term.

Solution to Problem

PTL 2 refers, as a problem, to the deposition of dust such as dirt in a use environment on the back side of a burner mat. With regard to the problem, when a surface combustion burner is used as a fuel ignition burner of a sintering machine as disclosed in PTL 3, combustion gas and air discharged from a nozzle to a combustion part of the burner contain little dust; however, blocking of the combustion part is still a problem.

We observed the state of a combustion part of a burner in an actual use environment of a sintering machine, and found that dust is intensively adhered to the front side instead of the back side of the combustion part. Further, we found that the adhered dust results from fine powders of iron ores flying from the downstream of the burner of the sintering machine. Specifically, fine powders of iron ores are adhered to a surface of a burner mat and are sintered to be stuck and deposited, thus causing passage blocking in the burner mat. Then, we made intensive studies on methods of preventing the passage blocking when dust such as fine powders of ores fly to a surface of a combustion part.

To prevent dust from blocking a passage of a combustion part, it is conceivable that the passage would be widened so as to secure the passage when dust is adhered and deposited. However, when a passage is widened, high-temperature dust may enter into the inside of a burner, and flame which extends from the outside toward the inside of the burner, i.e., flashback may be caused by radiation heat from the outside of the burner. Therefore, widening a passage only hinders stable combustion of a burner. Therefore, a method of preventing the passage blocking while properly maintaining the size of a passage is required. We found that a laminate having a specific structure can solve the problem, and completed the disclosure.

We thus provide the following.

1. A surface combustion burner comprising:
a nozzle configured to discharge fuel gas and air for combustion; and
a laminate, provided on a tip of the nozzle, in which a plurality of mesh plates is laminated, wherein the laminate includes a portion having an offset arrangement between at least any adjacent ones of the mesh plates, such that meshes of the adjacent mesh plates are mutually misaligned.

2. The surface combustion burner according to 1., wherein the laminate has an opening ratio of 8% or less.

3. The surface combustion burner according to 1. or 2., wherein the mesh plate has an opening ratio of 30% or more and 85% or less.

4. The surface combustion burner according to any one of 1. to 3., wherein the laminate has a lamination interval of 2 mm or less, the lamination interval being defined as a distance between mid-thickness positions of adjacent ones of the mesh plates.

5. The surface combustion burner according to any one of 1. to 4., wherein the mesh plate has mesh lines with a diameter of 0.2 mm to 2 mm.

6. The surface combustion burner according to any one of 1. to 5., wherein the mesh plate has openings with an average span of 1 mm to 5 mm.

7. The surface combustion burner according to any one of 1. to 6., wherein the laminate has four or more of the mesh plates.

8. The surface combustion burner according to any one of 1. to 7., wherein the mesh plate is a metal mesh.

9. The surface combustion burner according to any one of 1. to 8., further comprising woven metal fibers on the nozzle side of the laminate.

10. The surface combustion burner according to any one of 1. to 9., further comprising a heat resistant material on the nozzle side of the laminate.

11. The surface combustion burner according to 10., wherein the heat resistant material has a thickness of 3 mm to 20 mm.

12. A composite burner comprising: the surface combustion burner according to any one of 1. to 11.; a nozzle configured to discharge fuel gas; and a nozzle configured to discharge air for combustion.

13. An ignition device for a sintering machine which sinters iron ore raw materials, the ignition device comprising the composite burner according to 12.

Advantageous Effect

The disclosure can prevent the passage blocking caused by dust adhesion and ensure stable combustion of a burner for a long term. Further, in a conventional surface combustion burner, a burner mat of a combustion part has to be regularly removed for cleaning, but in our surface combustion burner, the cleaning cycle is significantly lengthened, thus reducing the load of maintenance.

DETAILED DESCRIPTION

Figure 1:
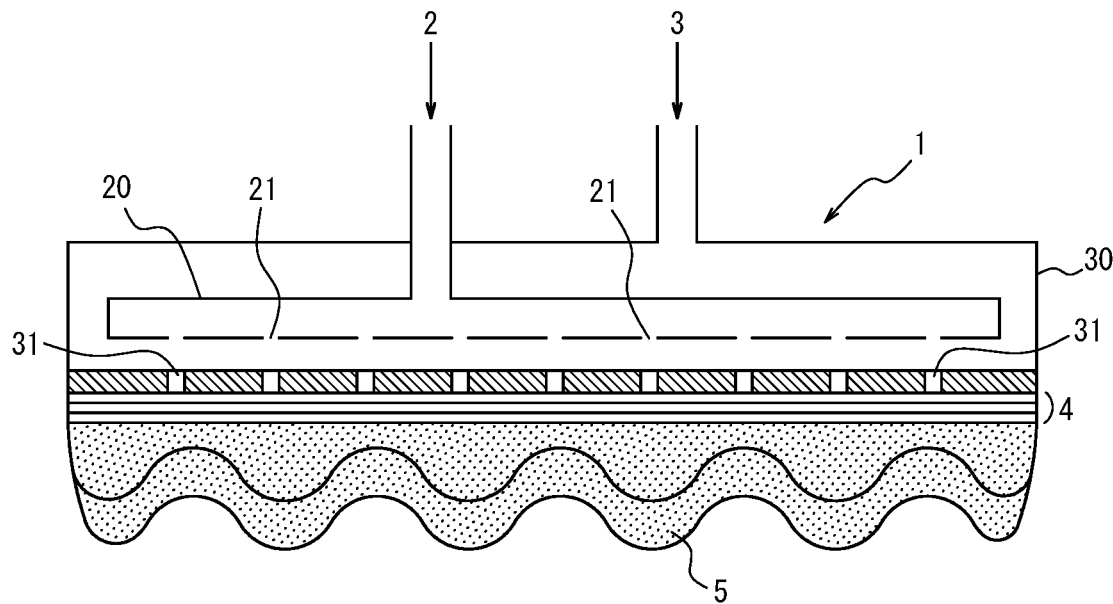
FIG. 1 is a sectional view illustrating the structure of a burner in one embodiment.
Figure 2:
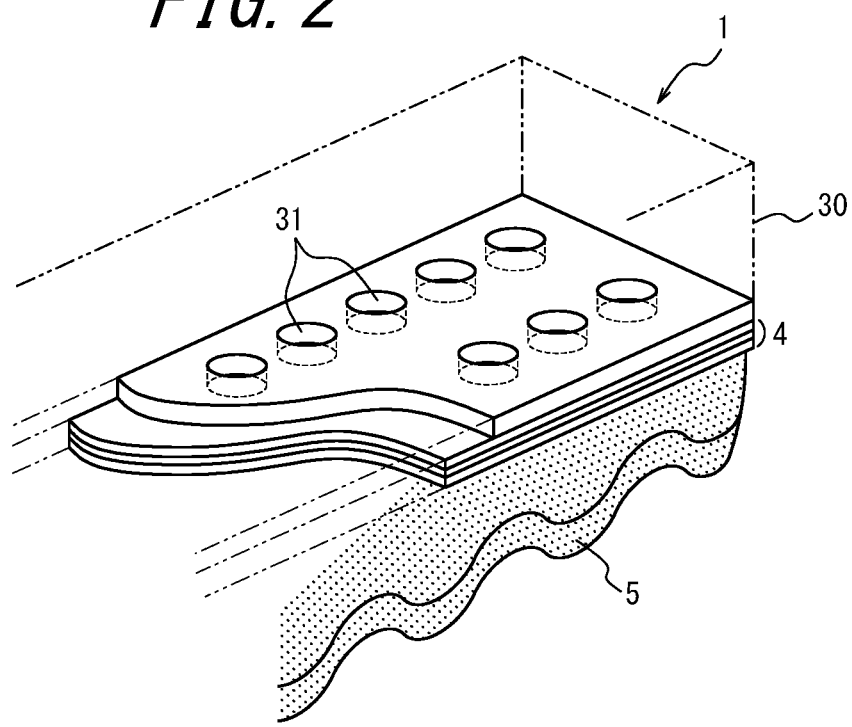
FIG. 2 is a perspective view illustrating the structure of a burner in one embodiment.

FIGS. 1 and 2 illustrate the structure of a surface combustion burner in one embodiment. A surface combustion burner 1 has a nozzle 20 configured to introduce and discharge fuel gas 2 and a nozzle 30 configured to introduce and discharge air for combustion 3, and on the discharge side of the fuel gas 2 of the nozzle 20 and the air for combustion 3 of the nozzle 30, has a laminate 4 as a combustion part. In the embodiment, the nozzle 20 is disposed inside of the nozzle 30. The fuel gas 2 discharged from nozzle holes 21 of the nozzle 20 are mixed with the air for combustion 3 introduced into the nozzle 30 in the nozzle 30, and subsequently, discharged from nozzle holes 31 to the laminate 4. The mixed gas of the fuel gas 2 and the air for combustion 3 is supplied to the outside, for example, into a sintering furnace through the laminate 4 and forms flame 5 on the surface of the laminate 4. The fuel gas 2 and the air for combustion 3 may be directly supplied to the laminate 4 from the nozzle 20 and the nozzle 30, respectively.

[Laminate]

Figure 3:
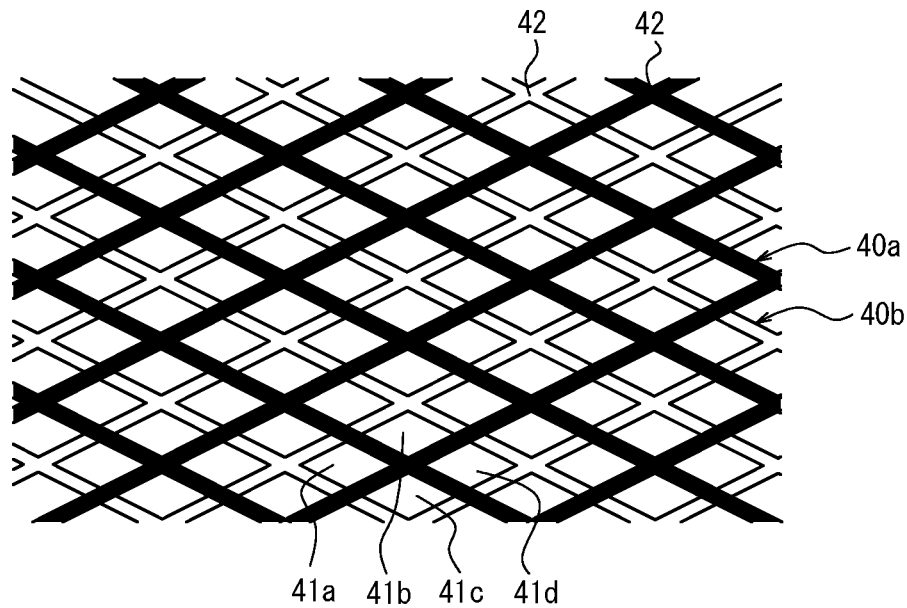
FIG. 3 illustrates the structure of a laminate in one embodiment.
Figure 4:
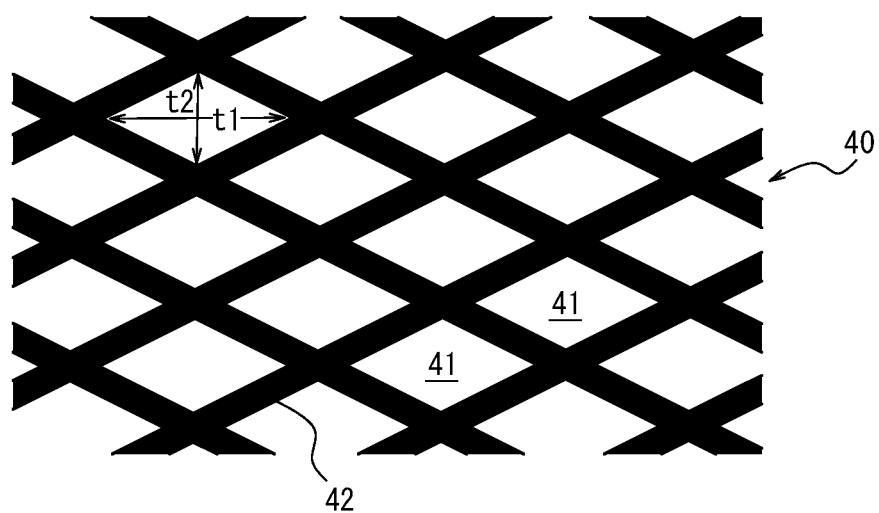
FIG. 4 illustrates the structure of a mesh plate in one embodiment.

In the surface combustion burner 1, it is important that the laminate 4 comprises a plurality of laminated mesh plates having an offset arrangement between at least adjacent ones of the mesh plates. One example of the laminate is illustrated in FIG. 3. The laminate 4 as a combustion part has a laminated structure in which a plurality of mesh plates 40 illustrated in FIG. 4 are layered. When a plurality of the mesh plates 40 are layered, the mesh plates 40 need to be laminated so as to have an offset arrangement between at least adjacent ones of the mesh plates, as illustrated in FIG. 3. The laminate 4 illustrated in FIG. 3 is an example in which two mesh plates 40 are laminated. When three or more mesh plates 40 are laminated, the mesh plates 40 may have an offset arrangement between at least adjacent ones of the mesh plates as illustrated in FIG. 3. Of course, the three or more mesh plates 40 may have an offset arrangement among all the mesh plates.

"Mesh plates 40 have an offset arrangement between adjacent ones of the mesh plates" means that in the laminate illustrated in FIG. 3, in which two mesh plates 40 illustrated in FIG. 4 are laminated, meshes 41 having the same size and shape never overlap with each other perfectly in the laminating direction. In other words, the two mesh plates 40 are disposed with each other so that at least any part of a mesh line part 42 of one mesh plate may be inside a mesh 41 of the other mesh plate. Preferably, as illustrated in FIG. 3, the mesh plates 40 should be disposed with each other so that a mesh line part 42 of one mesh plate may cross a mesh 41 of the other mesh plate, or so that a gas passage formed by a mesh (opening) 41 of one mesh plate may be divided by the other mesh plate into two or more passages, which is effective to prevent the passage blocking caused by dust.

In particular, in the example illustrated in FIG. 3, the opening range of a mesh 41 of a mesh plate 40a has an intersection part of mesh line parts 42 of a laminated mesh plate 40b, which produces four gaps 41a, 41b, 41c, and 41d in each mesh 41 of the mesh plates 41a and 40b when seen in the laminating direction. This disposition is preferable to prevent the passage blocking caused by dust. Other than the disposition, the mesh plates are preferably disposed so as to have an offset arrangement between adjacent ones of the mesh plates by, for example, rotating the mesh plates using the lamination direction as an axis.

As the mesh plate, a plate having a plurality of openings as passages through which gas can pass in the direction perpendicular to the plate face, i.e., a plate having a plurality of holes penetrating the plate in the thickness direction may be used. The mesh plate may be a mesh structure extending two-dimensionally or may be a mesh structure constituted three-dimensionally. For example, the mesh plate may be a metal mesh plate formed by combining a plurality of wire rods to a mesh shape, or may be an expanded metal formed by expanding a plate material after making cuts in the plate material. As the mesh plate, a punching metal may also be used.

The mesh plate preferably has, in the direction parallel to the plate face, cross sections which have different shapes in the thickness direction in the mesh plate itself. When a plurality of such mesh plates is laminated in an offset arrangement, air passages tend to be formed in the laminating direction and flying dust are easily adhered to the mesh plates as described below. On the other hand, when mesh plates are laminated which each have cross sections with the same shape in parallel to the plate face in the mesh plate itself like a punching metal, a passage tends to be formed linearly. Therefore, a mesh plate is preferably used which has, in the direction parallel to the plate face, cross sections which have different shapes in the thickness direction in the mesh plate itself. More specifically, one or both of an expanded metal or a metal mesh plate constituted by combining a plurality of wire rods are preferably used.

The shape of the opening of the mesh plate is not limited and the opening may have any shape. For example, the opening may have a polygonal shape or a circular shape. The polygonal shape includes any polygonal shape such as triangle, square, and hexagon. The opening may have, for example, a diamond shape as illustrated in FIG. 3. This disclosure can achieve the aforementioned effect in spite of the shape of the opening.

Further, mesh plates which have different mesh sizes and shapes may be laminated so as to dispose a mesh line part of one mesh plate in a mesh of the other mesh plate, thus forming a laminate.

Figure 5A:
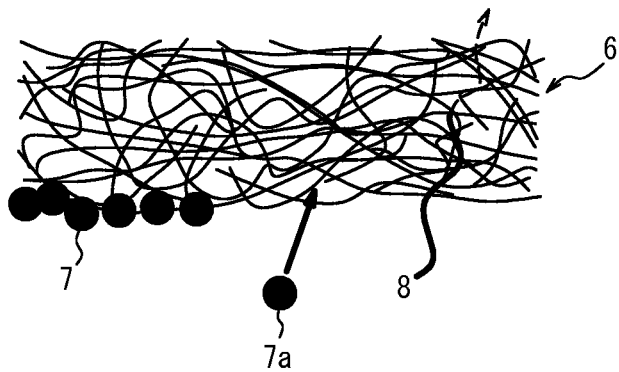
FIGS. 5A, 5B and 5C are schematic diagrams illustrating dust adhesion on a combustion part.
Figure 5B:
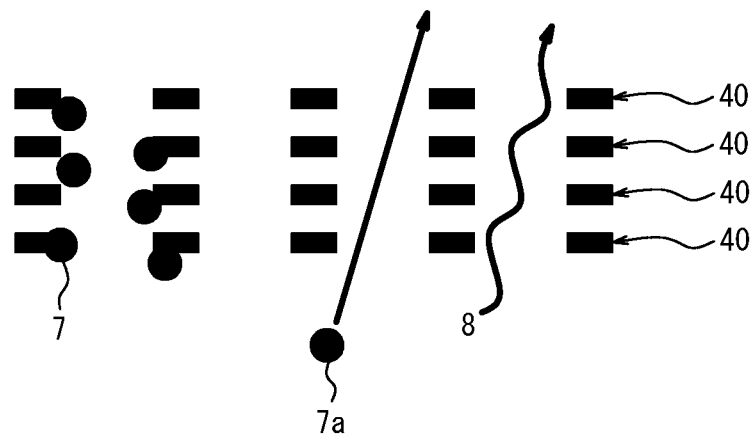
Figure 5C:
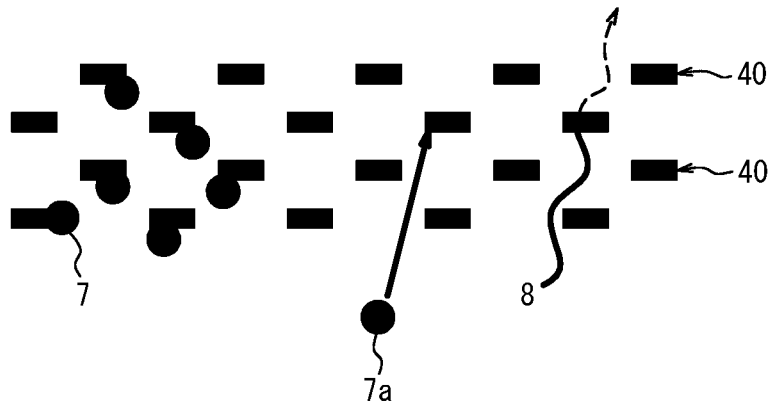

Next, the effect of the structure of the combustion part of the burner on the passage blocking caused by dust is explained with reference to FIGS. 5A to 5C. FIG. 5A illustrates a case which uses woven metal fibers (metal knit) 6 as a combustion part. FIG. 5B illustrates a case which uses, as a combustion part, a laminate having four mesh plates 40 layered so as to align meshes among the mesh plates. FIG. 5C illustrates a case which uses, as a combustion part, a laminate of four mesh plates 40 having an offset arrangement between adjacent ones of the mesh plates.

When dust 7 flies from the outside of the combustion part of the burner (lower side in FIGS. 5A to 5C), almost all of the dust 7 is adhered to a surface of the woven metal fibers 6 in FIG. 5A because the woven metal fibers 6 have fine fibers and spacing among the fibers are small, compared with the size of the dust. The dust accumulates continuously, causing passage blocking early.

In the laminate in FIG. 5B, flying dust is adhered and accumulates in the inside of passages extending straightly to easily cause passage blocking.

Additionally, high-temperature dust 7a which exists in an environment such as in a sintering machine easily intrudes into the inside of the combustion part, which is particularly problematic. Similarly, radiant heat 8 generated in an environment such as in a sintering machine also affects the inside of the combustion part, enhancing the risk of so-called flashback.

On the other hand, in the laminate in FIG. 5C, passages thread their ways in the laminating direction instead of extending straight. Thus, flying dust 7 is dispersed and adhered to a plurality of layers. As the result, it takes a long term for the dust to accumulate until it blocks the passages. Further, the laminate in FIG. 5C can prevent the intrusion of the high-temperature dust 7a into the inside of the burner 1 and the effect of the radiant heat 8 on the inside of the burner 1, and thus is excellent in terms of safety.

As the number of the mesh plates 40 laminated in an offset arrangement is increased, the intrusion of the dust 7 and the radiant heat 8 can be more prevented. Therefore, the laminate preferably comprises four or more mesh plates 40. In particular, dust with a particle size of 50 μm to 0.5 mm are almost uniformly adhered to the mesh plates 40 from the surface layer to the fourth layer of the laminate 4, further lengthening a time until the passages of the laminate are blocked. On the other hand, the effect of preventing the passage blocking in the laminate 4 becomes saturated when the number of the mesh plates 40 is more than 10. Thus, the number of the mesh plates 40 is preferably 10 or less. The number of the layers, however, can be varied according to, for example, the particle size distribution of the dust.

As described above, by laminating the mesh plates so as to have an offset arrangement between adjacent ones of the mesh plates, the laminate has an opening ratio smaller than that of the mesh plate. Further, when a plurality of mesh bodies which have different opening ratios is laminated, the obtained laminate has an opening ratio smaller than the smallest opening ratio of the mesh plate. The smallest opening ratio of the mesh plate means the smallest one of the opening ratios of the laminated mesh plates. The opening ratio of a laminate means a ratio of the opening parts area to the whole laminate area when the laminate is projected in the laminating direction. The offset arrangement between adjacent ones of the mesh plates is preferably adjusted so that the opening ratio of the laminate may be one-tenth or less of the biggest opening ratio of the mesh plate.

The opening ratio of the laminate is preferably 8% or less, and more preferably 5% or less. The opening ratio of 8% or less can prevent more effectively high-temperature dust from passing through. On the other hand, the opening ratio has any lower limit. Specifically, the opening ratio of the laminate may be more than 0% so that gas may pass through. When the opening ratio is 0.1% or more, however, pressure loss in the laminate is decreased, more easily securing the gas flow rate. Therefore, the opening ratio is preferably 0.1% or more, and more preferably 0.5% or more.

The opening ratio of the mesh plate is preferably 30% or more and 85% or less. When the opening ratio of the mesh plate is 30% or more, dust is adhered to the laminate more uniformly in the thickness direction, further lengthening a time until blocking occurs. Meanwhile, the opening ratio of the mesh plate of 85% or less can further prevent high-temperature of dust from passing through.

Further, the laminate 4 preferably has a lamination interval of the mesh plates 40 of 2 mm or less. When the lamination interval is 2 mm or less, the thickness of the laminate necessary to achieve a preferable opening ratio can be reduced. The lamination interval of the mesh plates is a distance between centers of adjacent mesh plates in the thickness direction of the laminate.

The mesh plate 40 preferably has mesh lines with a diameter of 0.2 mm to 2 mm. The "diameter of a mesh line" refers to a thickness of the mesh line part 42. When a cross section of the line is not circular, the diameter of the mesh line is the diameter of a circle internally contacted with the cross section. When the thickness of the mesh line part 42 is less than 0.2 mm, and the opening ratio of the mesh plate is 30% or more and 85% or less, the mesh plate tends to be fragile. On the other hand, the thickness is more than 2 mm, the laminate becomes too thick.

The mesh plate 40 preferably has an opening 41 with an average span of 1 mm to 5 mm. Specifically, when the average span of the opening 41 is less than 1 mm, almost all of dust is adhered to the surface layer of the laminate 4, easily blocking the opening 41. On the other hand, when the average span is more than 5 mm, dust easily passes through the opening 41.

When the mesh illustrated in FIG. 4 has a quadrangular shape, the average span of the opening 41 is one-half of the sum of the diagonal lines t1 and t2. When the mesh has a polygonal shape such as a triangular shape and a pentagonal shape or more, or an indefinite shape, the average span of the opening 41 is a diameter of a circumscribed circle of the mesh.

As the mesh plate, a mesh made of, for example, metal and ceramic can be used. In particular, a wire mesh made of metal is preferably used. Specifically, the mesh plate 40 made of metal is preferable because the mesh plate 40 can be fixed by welding in laminating. In particular, the mesh plate is preferably made of specific metal with high heat resistance such as Ni—Al alloy, Ni—Mo—Cr alloy, Ni—Mo—Cr—Nb alloy, and Ti alloy because the mesh plate directly contacts with flame.

Figure 6:
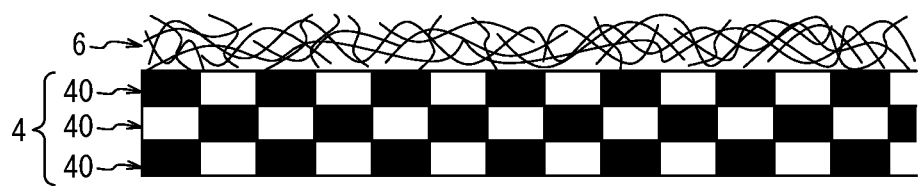
FIG. 6 illustrates the configuration of a laminate in another embodiment.

Further, the laminate preferably has woven metal fibers on the nozzle side of the burner. In other words, the woven metal fibers are preferably disposed between the laminate and the nozzle. Specifically, as illustrated in FIG. 6, when the laminate 4 is disposed on the surface on the nozzle side of the woven metal fibers 6, the laminate 4 can prevent the blocking of the surface layer, and the fine woven metal fibers 6 can almost completely prevent the intrusion of the dust 7 and the radiant heat 8 into the inside of the burner 1.

When the woven metal fibers are provided, the woven metal fibers can further have a second laminate on its nozzle side. The second laminate is a laminate comprising a plurality of laminated mesh plates as with the laminate 4 (first laminate). The mesh plates constituting the second laminate, however, may or may not include a portion having an offset arrangement.

Figure 7:
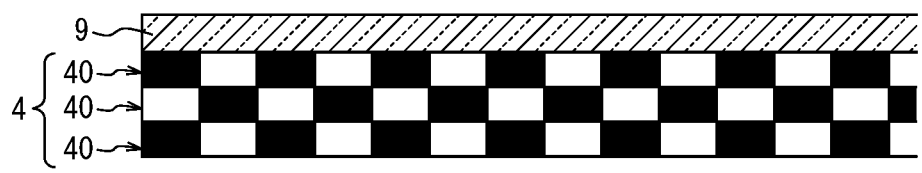
FIG. 7 illustrates the configuration of a laminate in another embodiment.

Further, as illustrated in FIG. 7, the laminate 4 preferably has a heat resistant material 9 on its nozzle side. The heat resistant material 9 is preferably, for example, a heat resistant material layer with gas permeability. The heat resistant material 9 includes a material in which particulate heat resistant materials are layered, and a porous sheet material with heat resistance.

When the heat resistant material 9 is provided, the heat resistant material 9 heated to high temperature serves as an ignition source, thus improving the stability of flame. Further, even if the fuel gas 2 and the air for combustion 3 are insufficiently mixed with each other in the burner 1, the heat resistant material 9 assists the mixing, thus further improving the stability of flame.

When particulate heat resistant materials are used, the size of one particulate heat resistant material (diameter of a circumscribed ball) is preferably 1 mm to 15 mm, and more preferably 1.5 mm to 5 mm. Specifically, when the size of the particulate heat resistant material 9 is 1 mm or less, the heat resistant material may fall through an opening of the laminate 4, and may block a passage of the laminate. On the other hand, when the size of one particulate heat resistant material 9 is more than 15 mm, the effect of promoting mixing cannot be adequately achieved. In particular, by using the heat resistant material 9 with the size of 1.5 mm to 5 mm, the variation of the particle size becomes small to more preferably form uniform flame. The heat resistant material 9 may have any shape such as a ball shape, a cylindrical shape, and an angular shape. The thickness of the heat resistant material 9 (thickness of a particulate layer or thickness of a sheet material with heat resistance) is preferably 3 mm to 20 mm.

When the heat resistant material is provided, the heat resistant material can further have a second laminate on its nozzle side. The second laminate is a laminate comprising a plurality of laminated mesh plates as with the laminate 4 (first laminate). The mesh plates constituting the second laminate, however, may or may not include a portion having an offset arrangement.

When the burner has both the woven metal fibers and the heat resistant material, the woven metal fibers and the heat resistant material can be provided in any order between the nozzle and the laminate. For example, the woven metal fibers may be provided on the nozzle side of the laminate, and the heat resistant material may be provided of the nozzle side of the woven metal fibers. Alternatively, the heat resistant material may be provided on the nozzle side of the laminate, and the woven metal fibers may be provided of the nozzle side of the heat resistant material. In either case, the second laminate can be further provided on a surface contacting with the nozzle.

[Composite Burner]

Figure 10:
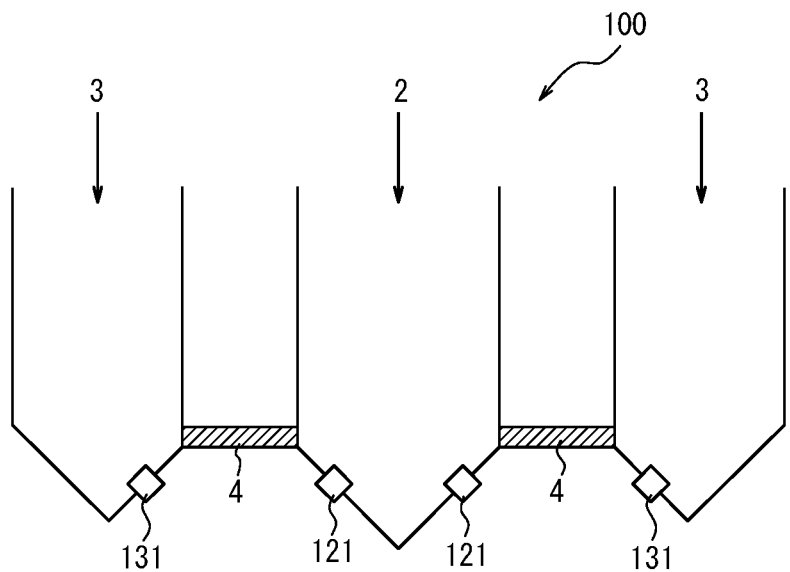
FIG. 10 is a sectional view illustrating the structure of a composite burner in one embodiment.
Figure 11:
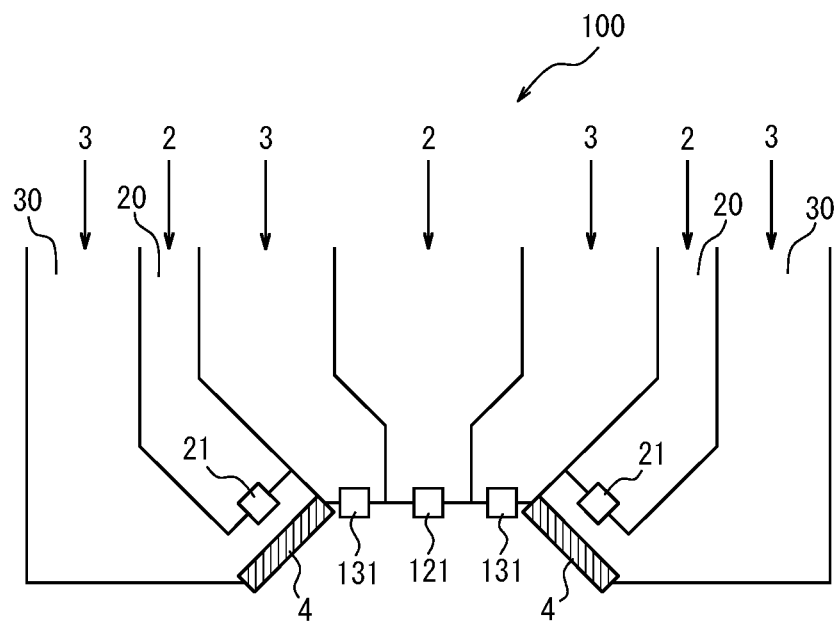
FIG. 11 is a sectional view illustrating the structure of a composite burner in another embodiment.

Next, a composite burner comprising the aforementioned surface combustion burner is explained. Our surface combustion burner can be integrally combined with a nozzle 121 configured to discharge fuel gas and a nozzle 131 configured to discharge air for combustion to form a composite burner 100, as FIGS. 10 and 11 illustrates its sectional view. In the composite burner 100, fuel gas discharged from the nozzle 121 is combusted using air for combustion discharged from the nozzle 131 to form main flame. The part comprising the nozzle 121 and the nozzle 131 to form the main flame is called a main burner. Meanwhile, the surface combustion burner included in the composite burner 100 is used to ignite fuel gas discharged from the nozzle 121 or to assist the main flame formed in the main burner. Therefore, the nozzle 121 is a fuel gas discharge nozzle for the main burner and the nozzle 131 is an air for combustion discharge nozzle for the main burner.

In the composite burner 100 illustrated in FIG. 10, the nozzle 121 configured to discharge fuel gas 2 for the main burner and the nozzle 131 configured to discharge air for combustion for the main burner are disposed so as to sandwich the laminate 4 of the surface combustion burner. In the composite burner illustrated in FIG. 11, the nozzle 121 configured to discharge the fuel gas 2 for the main burner and the nozzle 131 configured to discharge the air for combustion for the main burner are disposed between the laminates 4 of two surface combustion burners.

For the sake of convenience, FIG. 10 illustrates the laminate 4 of the surface combustion burner only, omitting the nozzles of the surface combustion burner. On the upstream side of the laminate 4, however, the nozzle 20 configured to discharge the fuel gas 2 and the nozzles 30 configured to discharge the air for combustion 3 are provided as in the surface combustion burner 1 illustrated in FIG. 1, thus constituting the surface combustion burner with the laminate 4.

In FIG. 11, the surface combustion burner has a structure of nozzle holes which are same as 31 of FIG. 1 on the upstream side of the laminate 4 (not illustrated). The part from the passage configured to supply the air for combustion 3 to the laminate 4 corresponds to the nozzle 30 configured to discharge air for combustion of FIG. 1. Further, the part from the passage configured to supply the fuel gas 2 to the nozzle hole 21 provided on the end of the passage corresponds to the nozzle 20 configured to discharge fuel gas of FIG. 1. The fuel gas 2 and the air for combustion 3 are mixed on the downstream side of the nozzle hole 21 to be introduced to the laminate 4. The surface combustion burner may have one nozzle hole 21 or may have a plurality of nozzle holes 21 as illustrated in FIG. 1.

By using the composite burner having the aforementioned structure, even when the fuel gas is discharged at high speed, stable flame at high speed can be held by virtue of flame of the surface combustion burner, effectively heating an object at a position far from the composite burner.

Figure 9:
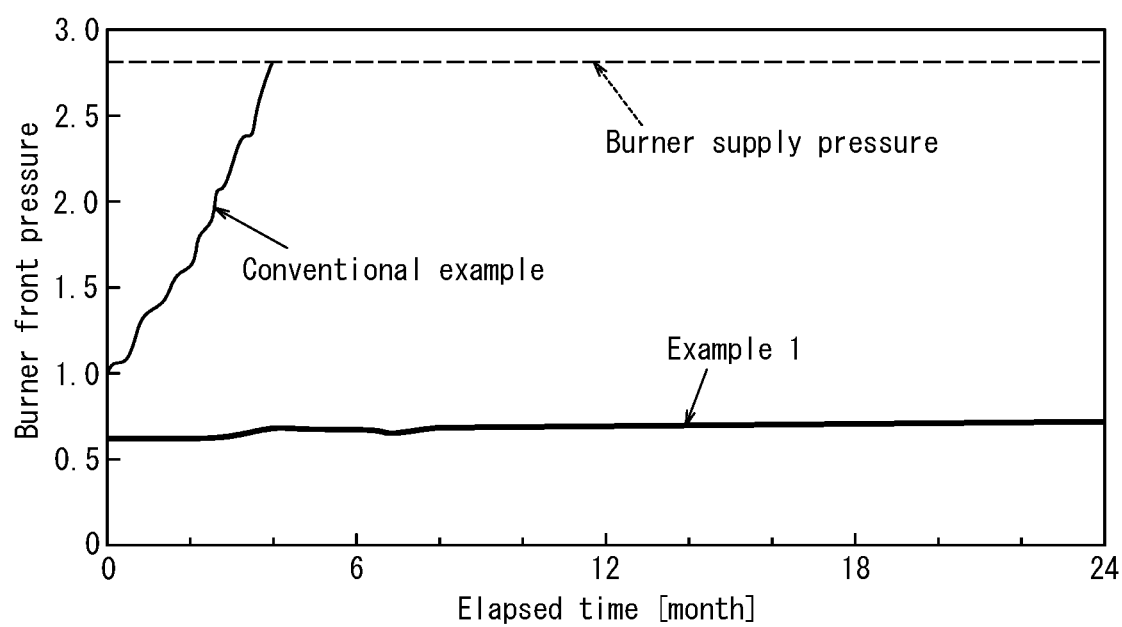
FIG. 9 illustrates the changes in the burner front pressure in each burner.

The composite burner can be preferably used as, for example, an ignition device in a sintering machine which combusts fuel mixed in iron ore raw materials to sinter the iron ore raw materials. In the inside of the ignition device of the sintering machine, a lot of dust in the raw materials splatters, causing blocking in the burner. Further, the sintering machine often has a temperature exceeding 1000° C. and is operated for 24 hours. Thus, using our surface combustion burner extremely reduces the load of maintenance.

fibers (metal knit made of heat-resistant metal, Fecralloy®; Fecralloy is a registered trademark in Japan, other countries, or both) (conventional example) and in a burner with a laminate in which six mesh plates were laminated with meshes of the mesh plates being aligned among all the plates (comparative example). These investigation results were evaluated using an index where the burner front pressure at the time of starting use of the burner of the conventional example was taken to be 1. The results are illustrated in FIG. 9.

TABLE 1

| | | Mesh plate | | | | | Laminate | | | |
|---|---|---|---|---|---|---|---|---|---|---|
| No | Combustion part | Mesh shape | Opening average span (mm) | Mesh line diameter (mm) | Opening ratio (%) | Material | Mesh | Number of layers | Layer interval (mm) | Opening ratio (%) | Remarks |
| 1 | Metal knit | — | — | — | — | — | — | — | — | — | Conventional example |
| 2 | Laminate | Diamond | 2.5 | 0.5 | 49 | SUS | Aligned | 6 | 1.2 | 49 | Comparative example |
| 3 | Laminate | Diamond | 2.5 | 0.5 | 49 | SUS | Misaligned | 6 | 1.2 | 1 | Example 1 |

EXAMPLES

Example 1

Figure 8:
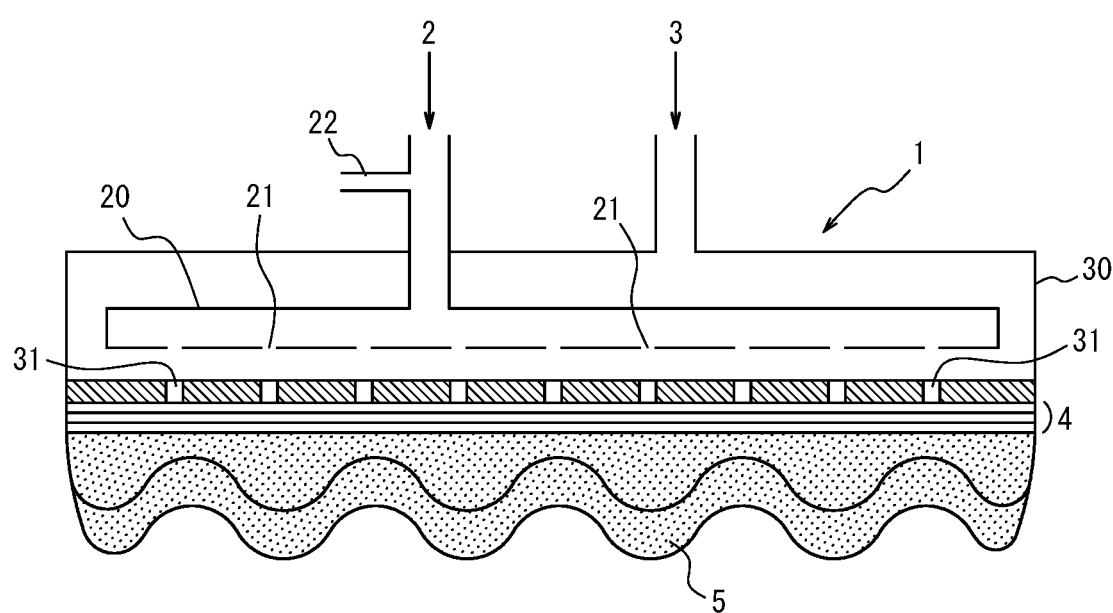
FIG. 8 illustrates the structure of a burner used in one embodiment.

A surface combustion burner illustrated in FIG. 8 was made. The surface combustion burner had a laminate with specifications as listed in Table 1. A mesh body used in Example 1 was formed of wires made of stainless steel (SUS) with a thickness (diameter) of a mesh line part listed in Table 2, and had diamond-shaped openings. The average span of the openings was as listed in Table 2. Further, when the laminate included a portion having an offset arrangement between at least any adjacent ones of the mesh plates, the "meshes" were called misaligned, and when the laminate did not include a portion having an offset arrangement, the "meshes" were called aligned.

To quantitatively evaluate how easily the actual device of the made surface combustion burner was blocked in a dust environment, the surface combustion burner was additionally disposed near a conventional slit burner in an ignition furnace of a sintering machine, and the burners were combusted at the same time. During such an experiment, pressure in the connection part between a pipe of fuel gas and each burner (hereinafter, referred to as burner front pressure) was measured on a regular basis. The conventional slit burner was a premixing-type burner in which premixed fuel gas and air for combustion were combusted. In the measurement, the flow rate of the fuel gas and the air for combustion were constant. As the burner was blocked, the burner front pressure was increased. The surface combustion burner illustrated in FIG. 8 had the same burner structure as illustrated in FIG. 1 except that a hole labeled 22 was added for measurement of the burner front pressure.

As the fuel gas, M gas (mixed gas of coke oven gas and blast furnace gas) was used which was by-product gas in a steelworks. The main components of the M gas were $H_2$: 26.5%, CO: 17.6%, $CH_4$: 9.1%, and $N_2$: 30.9%.

For comparison, the burner front pressure was also measured in a burner which used conventional woven metal From the results illustrated in FIG. 9, it is found that in the surface combustion burner of the conventional example (No. 1), the burner front pressure was sharply increased and reached the gas supply pressure four months after starting use of the burner, stopping the flow of a required amount of gas. In the surface combustion burner of the comparative example (No. 2), the burner front pressure reached the gas supply pressure eighteen months after starting use of the burner, stopping the flow of a required amount of gas. On the other hand, in our burner of No. 3, the burner front pressure was not changed very little after twenty-four months, and could maintain the gas flow rate for a sufficiently long time.

Example 2

A composite burner illustrated in FIG. 10 was used as an ignition burner of a sintering machine to evaluate burner blocking during use. In the composite burner of FIG. 10, as described above, the surface combustion burner was used as a pilot flame burner which assisted combustion of the main burner. The surface combustion burner had a laminate 4 and mesh plates constituting the laminate 4 with specifications as listed in Table 2. The fields of the mesh average span (mm) in Table 2 also show, in parentheses, lengths (mm) of the diagonal lines of the used mesh plates.

The blocking in the burner was evaluated by measuring pressure in the connection part between a pipe of fuel gas and the burner (hereinafter, referred to as burner front pressure) on a regular basis while keeping the flow rates of the fuel gas and the air for combustion constant. As the fuel gas, M gas which was by-product gas in a steelworks was used as in Example 1.

Figure 12:
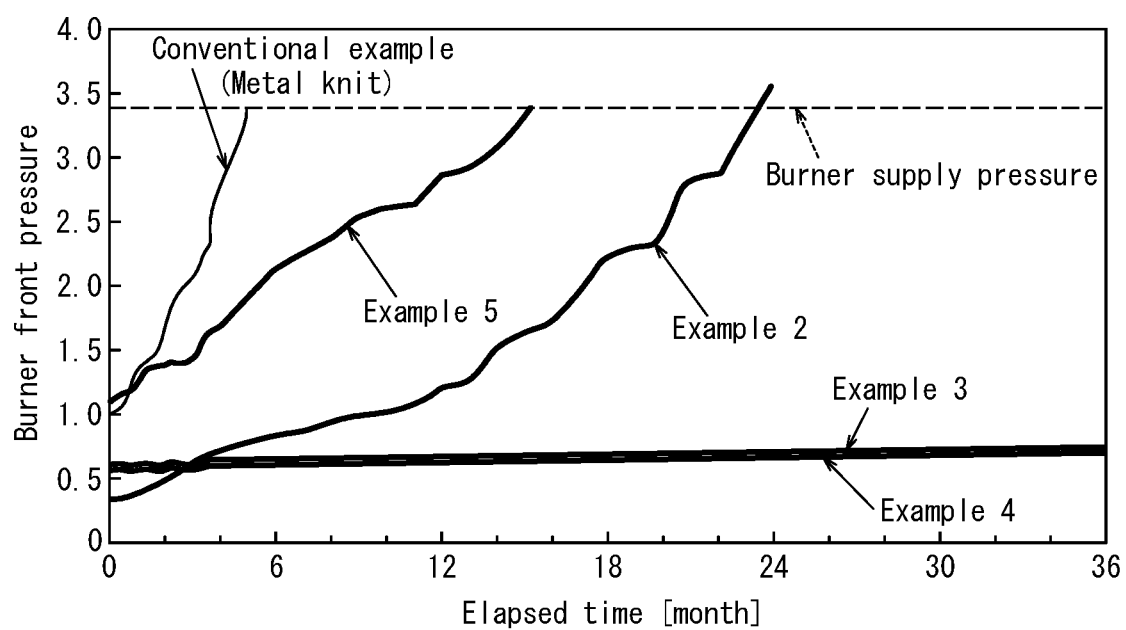
FIG. 12 illustrates the changes in the burner front pressure in each burner.

For comparison, the burner front pressure was also measured in a composite burner which used, as the laminate 4 of the surface combustion burner, conventional woven metal fibers (metal knit made of heat-resistant metal, Fecralloy®) (conventional example) and in a composite burner which used, as the laminate 4 of the surface combustion burner, a laminate in which five mesh plates were laminated with meshes of the mesh plates being aligned among all the plates (comparative example). These investigation results were evaluated using an index where the burner front pressure at the time of starting use of the conventional burner was taken to be 1. FIG. 12 illustrates the results.

TABLE 2

| No | Combustion part | Mesh plate | | | | Laminate | | | | | Remarks |
| --- | --- | --- | --- | --- | --- | --- | --- | --- | --- | --- | --- |
| | | Mesh shape | Opening average span (mm) | Mesh line diameter (mm) | Opening ratio (%) | Material | Mesh | Number of layers | Layer interval (mm) | Opening ratio (%) | |
| 1 | Metal knit | — | — | — | — | — | — | — | — | — | Conventional example |
| 2 | Laminate | Diamond | 2.5 (2 × 3) | 0.38 | 60 | SUS316L | Aligned | 5 | 0.4 | 60 | Comparative example |
| 3 | Laminate | Diamond | 3.5 (3 × 4) | 0.53 | 61 | SUS310S | Misaligned | 5 | 0.6 | 8 | Example 2 |

The conventional example of No. 1 used a metal knit made of heat-resistant metal, Fecralloy® as the pilot flame burner, but flame became unstable after about four months of use because the gas flow rate was decreased due to blocking. Thus, the conventional example had to be operated with a decreased flow speed to prevent blowoff of the main burner, deteriorating the basic unit of the fuel gas. Therefore, the burner had to be removed for cleaning every four months, resulting in a heavy load of maintenance. By using the burner of No. 3 (Example 2), as illustrated in FIG. 12, it took two years for the flow rate to be decreased, thus reducing the load of maintenance. On the other hand, the comparison burner of No. 2 had to be operated after about eight months of use with a decreased flow speed to prevent blowoff of the main burner as with the burner of No. 1, deteriorating the basic unit of the fuel gas. Therefore, the burner had to be removed for cleaning every eight months, resulting in a heavy load of maintenance.

Example 3

Under the same conditions as Example 2 except that a composite burner having the structure illustrated in FIG. 11 was used, burner blocking of the burner accompanying its use was evaluated. The specifications of the laminate 4 of the surface combustion burner and the mesh plates constituting the laminate 4 were as listed in Table 3. The fields of the mesh average span (mm) in Table 3 also show, in parentheses, lengths (mm) of the diagonal lines of the used mesh plates.

For comparison, the burner front pressure was also measured in a composite burner which used, as the laminate 4 of the surface combustion burner, conventional woven metal fibers (metal knit made of heat-resistant metal, Fecralloy®) (conventional example) and in a composite burner which used, as the laminate 4 of the surface combustion burner, a laminate in which five mesh plates were laminated with meshes of the mesh plates being aligned among all the plates (comparative example). These investigation results were evaluated using an index where the burner front pressure at the time of starting use of the conventional burner was taken to be 1. FIG. 12 illustrates the results.

TABLE 3

| No | Combustion part | Mesh plate | | | | Laminate | | | | | Remarks |
| --- | --- | --- | --- | --- | --- | --- | --- | --- | --- | --- | --- |
| | | Mesh shape | Opening average span (mm) | Mesh line diameter (mm) | Opening ratio (%) | Material | Mesh | Number of layers | Layer interval (mm) | Opening ratio (%) | |
| 1 | Metal knit | — | — | — | — | — | — | — | — | — | Conventional example |
| 2 | Laminate | Diamond | 2.5 (2 × 3) | 0.4 | 60 | SUS316L | Aligned | 5 | 0.4 | 60 | Comparative example |
| 3 | Laminate | Diamond | 1.5 (1 × 2) | 0.3 | 44 | SUS316L | Misaligned | 6 | 0.3 | 0.7 | Example 3 |
| 4 | Laminate | Diamond | 3.5 (3 × 4) | 0.5 | 63 | SUS316L | Misaligned | 6 | 0.5 | 6 | Example 4 |
| 5 | Laminate | Diamond | 3.5 (3 × 4) | 0.1 | 92 | SUS316L | Misaligned | 6 | 0.1 | 61 | Example 5 |

The conventional example of No. 1 used a metal knit made of heat-resistant metal, Fecralloy® as the pilot flame burner, but flame became unstable after about four months of use because the gas flow rate was decreased due to blocking. Thus, the conventional example had to be operated with a decreased flow speed to prevent blowoff of the main burner, deteriorating the basic unit of the fuel gas. Therefore, the burner had to be removed for cleaning every four months, resulting in a heavy load of maintenance. The burners of No. 3 and No. 4 (Examples 3 and 4) had no decrease in the flow rate after three years as illustrated in FIG. 12, significantly reducing the load of maintenance. The burner of No. 5 (Example 5) had a high opening ratio and thus had a worse result than the burners of No. 3 and No. 4, but was sufficiently effective compared with the conventional example. On the other hand, the comparison burner of No. 2, after about 8 months of use, had to be operated with a decreased flow speed to prevent blowoff of the main burner as with the burner of No. 1, deteriorating the basic unit of the fuel gas. Therefore, the burner had to be removed for cleaning every eight months, resulting in a heavy load of maintenance.

REFERENCE SIGNS LIST 1 surface combustion burner
2 fuel gas
3 air for combustion 4 laminate (combustion part)
5 flame
6 woven metal fibers
7 dust
8 radiant heat
9 heat resistant material
20 nozzle
21 nozzle hole
30 nozzle
31 nozzle hole
40 mesh plate
41 opening
42 mesh line part
100 composite burner
121 nozzle
131 nozzle

The invention claimed is:

1. A surface combustion burner comprising:
a nozzle; and
a laminate in which a plurality of mesh plates are laminated, wherein
the nozzle comprises:
an outer nozzle configured to discharge fuel gas and air for combustion from at least one nozzle hole on a downstream side of the outer nozzle; and
an inner nozzle, that is located in the outer nozzle, configured to discharge the air for combustion from at least one nozzle hole toward the at least one nozzle holes of the outer nozzle,
the laminate is disposed flush against the outer nozzle over an entire surface of a downstream side of the outer nozzle such that the laminate forms an outermost surface of a combustion burner and covers all the nozzle holes of the outer nozzle,
the laminate has four or more of the mesh plates,
the laminate includes a portion having an offset arrangement between at least any adjacent ones of the mesh plates,
the laminate is positioned such that flame forms on an external most surface of the laminate,
the laminate has an opening ratio of 8% or less, and
each mesh plate of the plurality of mesh plates has an opening ratio of 30%-85%.

2. The surface combustion burner according to claim 1, wherein the laminate has a lamination interval of 2 mm or less, the lamination interval being defined as a distance between mid-thickness positions of adjacent ones of the mesh plates.

3. The surface combustion burner according to claim 1, wherein each mesh plate of the plurality of mesh plates has mesh lines with a diameter of 0.2 mm to 2 mm.

4. The surface combustion burner according to claim 1, wherein each mesh plate of the plurality of mesh plates has openings with an average span of 1 mm to 5 mm.

5. The surface combustion burner according to claim 1, wherein each mesh plate of the plurality of mesh plates is a metal mesh.

6. A surface combustion burner comprising:
a nozzle;
woven metal fibers that; and
a laminate in which a plurality of mesh plates are laminated, wherein
the nozzle comprises:
an outer nozzle configured to discharge fuel gas and air for combustion from at least one nozzle hole on a downstream side of the outer nozzle; and
an inner nozzle, that is located in the outer nozzle, configured to discharge the air for combustion from at least one nozzle hole toward the at least one nozzle hole of the outer nozzle,
the woven metal fibers are disposed flush against the outer nozzle over an entire surface of a downstream side of the outer nozzle and covers all the nozzle holes of the outer nozzle,
the laminate is disposed flush against the woven metal fibers such that the laminate forms an outermost surface of the combustion burner,
the laminate has four or more of the mesh plates,
the laminate includes a portion having an offset arrangement between at least any adjacent ones of the mesh plates,
the laminate is positioned such that flame forms on an external most surface of the laminate,
the laminate has an opening ratio of 8% or less, and
each mesh plate of the plurality of mesh plates has an opening ratio of 30%-85%.

7. A surface combustion burner comprising:
a nozzle;
a heat resistant material; and
a laminate in which a plurality of mesh plates are laminated, wherein
the nozzle comprises:
an outer nozzle configured to discharge fuel gas and air for combustion from at least one nozzle hole on a downstream side of the outer nozzle; and
an inner nozzle, that is located in the outer nozzle, configured to discharge the air for combustion from at least one nozzle hole toward the at least one nozzle hole of the outer nozzle,
the heat resistant material is disposed flush against the outer nozzle over an entire surface of a downstream side of the outer nozzle and covers all the nozzle holes of the outer nozzle,
the laminate is disposed flush against the heat resistant material such that the laminate forms an outermost surface of the combustion burner,
the laminate has four or more of the mesh plates,
the laminate includes a portion having an offset arrangement between at least any adjacent ones of the mesh plates,
the laminate is positioned such that flame forms on an external most surface of the laminate,
the laminate has an opening ratio of 8% or less, and
each mesh plate of the plurality of mesh plates has an opening ratio of 30%-85%.

8. The surface combustion burner according to claim 7, wherein the heat resistant material has a thickness of 3 mm to 20 mm.

9. The surface combustion burner according to claim 7, wherein
the heat resistant material is a material in which particulate heat resistant materials are layered.

* * * * *